United States Patent
Blasco Serrano et al.

(10) Patent No.: US 10,440,669 B2
(45) Date of Patent: Oct. 8, 2019

(54) SYNCHRONIZATION-DEPENDENT TRANSMISSION FOR VEHICLE TO ANYTHING COMMUNICATION

(71) Applicant: Telefonaktiebolaget LM Ericsson (publ), Stockholm (SE)

(72) Inventors: Ricardo Blasco Serrano, Stockholm (SE); Stefano Sorrentino, Solna (SE)

(73) Assignee: Telefonaktiebolaget LM Ericsson (Publ) (SE)

(*) Notice: Subject to any disclaimer, the term of this patent is extended or adjusted under 35 U.S.C. 154(b) by 0 days.

(21) Appl. No.: 15/315,266

(22) PCT Filed: Nov. 1, 2016

(86) PCT No.: PCT/SE2016/051069
§ 371 (c)(1),
(2) Date: Nov. 30, 2016

(87) PCT Pub. No.: WO2017/078596
PCT Pub. Date: May 11, 2017

(65) Prior Publication Data
US 2017/0303218 A1    Oct. 19, 2017

Related U.S. Application Data

(60) Provisional application No. 62/251,418, filed on Nov. 5, 2015.

(51) Int. Cl.
*H04B 1/7073* (2011.01)
*H04W 56/00* (2009.01)
(Continued)

(52) U.S. Cl.
CPC ........... *H04W 56/001* (2013.01); *G01S 19/25* (2013.01); *H04B 1/7073* (2013.01);
(Continued)

(58) Field of Classification Search
CPC .. H04W 56/00; H04W 56/001; H04B 7/0689; H04B 17/21; H04B 17/24; H04B 17/309; H04B 1/401
(Continued)

(56) References Cited

U.S. PATENT DOCUMENTS 7,822,159 B2 * 10/2010 Fujita ................. H04B 1/40
375/353
2005/0185733 A1 * 8/2005 Tolli .................. H04L 1/0025
375/285
(Continued)

FOREIGN PATENT DOCUMENTS

DE    10 2007 009504 A1    8/2008
DE    102007009504 A1    8/2008
(Continued)

OTHER PUBLICATIONS

International Search Report and Written Opinion dated Dec. 19, 2016 for International Application Serial No. PCT/SE2016/050883, International Filing Date: Sep. 21, 2016 consisting of 13-pages.
(Continued)

*Primary Examiner* — Emmanuel Bayard
(74) *Attorney, Agent, or Firm* — Christopher & Weisberg, PA

(57) ABSTRACT

A method and a device configured for selecting a transmission parameter in a wireless communication network are disclosed. According to one aspect, at least one transmission parameter is selected based at least upon an estimated level of synchronization for the first wireless device.

33 Claims, 4 Drawing Sheets

(51) Int. Cl.
  *H04L 1/00* (2006.01)
  *H04W 76/14* (2018.01)
  *G01S 19/25* (2010.01)
  *H04L 5/00* (2006.01)
  *H04W 72/02* (2009.01)

(52) U.S. Cl.
  CPC .......... *H04L 1/0001* (2013.01); *H04L 1/0015* (2013.01); *H04L 5/00* (2013.01); *H04W 72/02* (2013.01); *H04W 76/14* (2018.02); *H04L 1/0003* (2013.01); *H04L 1/0007* (2013.01); *H04L 1/0009* (2013.01)

(58) Field of Classification Search
  USPC .......................... 375/219–220, 354, 356–368
  See application file for complete search history.

(56) References Cited

U.S. PATENT DOCUMENTS

| | | |
|---|---|---|
| 2006/0135150 A1 | 6/2006 | Oh |
| 2007/0211624 A1 | 9/2007 | Schmidt et al. |
| 2008/0107221 A1 | 5/2008 | Yamanaka et al. |
| 2010/0023232 A1 | 1/2010 | Isaji et al. |
| 2010/0058101 A1* | 3/2010 | Shahid .............. G06F 1/12 713/500 |
| 2010/0094532 A1 | 4/2010 | Vorona |
| 2012/0058763 A1 | 3/2012 | Zhao |
| 2012/0122515 A1 | 5/2012 | Han et al. |
| 2012/0319902 A1* | 12/2012 | Floch .............. G01S 19/22 342/373 |
| 2013/0142177 A1* | 6/2013 | Nentwig ............ H04W 56/001 370/336 |
| 2013/0343343 A1 | 12/2013 | Shahid |
| 2014/0192793 A1* | 7/2014 | Abraham .......... H04W 56/0015 370/338 |
| 2014/0301331 A1 | 10/2014 | Niewczas |
| 2015/0215767 A1 | 7/2015 | Siomina et al. |
| 2015/0230194 A1 | 8/2015 | Yang et al. |
| 2015/0245397 A1 | 8/2015 | Sachs et al. |
| 2015/0319725 A1* | 11/2015 | Marshall .......... H04W 56/0015 370/350 |
| 2016/0142994 A1* | 5/2016 | Luo .................. H04W 56/0015 370/328 |
| 2016/0262120 A1* | 9/2016 | Shani ................. H04W 40/244 |
| 2016/0278061 A1 | 9/2016 | Peng |
| 2016/0381670 A1 | 12/2016 | Kim et al. |
| 2017/0034842 A1 | 2/2017 | Xu et al. |
| 2017/0086028 A1 | 3/2017 | Hwang et al. |
| 2017/0288806 A1 | 10/2017 | Blasco Serrano et al. |

FOREIGN PATENT DOCUMENTS

| | | |
|---|---|---|
| EP | 1983783 A1 | 10/2008 |
| EP | 2549807 A1 | 1/2013 |
| EP | 3113560 A1 | 1/2017 |
| JP | 2007306120 A | 11/2007 |
| JP | 200933340 A | 2/2009 |
| RU | 2511526 C2 | 10/2014 |
| WO | 2007045505 A1 | 4/2007 |
| WO | 2011151662 A1 | 12/2011 |
| WO | 2015080510 A1 | 6/2015 |
| WO | 2015139320 A1 | 9/2015 |
| WO | 2015172666 A1 | 11/2015 |
| WO | 2017052320 A1 | 3/2017 |
| WO | 2017052453 A1 | 3/2017 |

OTHER PUBLICATIONS

International Search Report and Written Opinion dated Jun. 19, 2017 for International Application Serial No. PCT/SE2016/051069, International Filing Date: Nov. 1, 2016 consisting of 23-pages.
3GPP TSG RAN WG1 Meeting#78 R1-142937, Title: "Comparison of Hierarchical and Flat synchronization procedures", Source: CEWiT, Agenda Item: 7.2.3.3.3, Document for: Discussion, Location and Date: Dresden, Germany Aug. 18-22, 2014 consisting of 7-pages.
3GPP TSG RAN WG1 Meeting #78bis R1-144020, Title: "Discussion on UE procedures for D2DSS transmission and reception," Source: LG Electronics, Agenda Item: 7.2.1.1.6, Document for: Discussion and Decision, Location and Date: Ljubljana, Solvenia Oct. 6-10, 2014 consisting of 3-pages.
3GPP TSG-RAN WG4 #72 R4-146428, Title: "Further Discussion on LC_MTC RLM parameters setup," Source: Ericsson, Agenda Item: 7.3.4, Document for: Discussion, Location and Date: Singapore Oct. 6-10, 2014 consisting 5-pages.
Office Action dated Feb. 8, 2018 for U.S. Appl. No. 15/314,333, filed Nov. 28, 2016, consisting of 10-pages.
International Preliminary Report on Patentability dated Nov. 30, 2017 for International Application No. PCT/SE2016/050883 filed on Sep. 21, 2016, consisting of 9-pages.
Australian Examination Report for dated Jul. 12, 2018 for Application No. 2016327702, consisting of 5-pages.
Russian Office Action and Translation dated Feb. 5, 2019, for Application No. 2018115209, filed Sep. 21, 2016, consisting of 15-pages.
Japanese Office Action and English Translation for Japanese Patent Application No. 2018-513442 dated Mar. 1, 2019, consisting of 4-pages.
3GPP TR 22.885 V1.0.0; 3rd Generation Partnership Project; Technical Specification Group Services and System Aspects; Study on LTE Support for V2X Services (Release 14); Sep. 2015, consisting of 43-pages.

* cited by examiner

SYNCHRONIZATION-DEPENDENT TRANSMISSION FOR VEHICLE TO ANYTHING COMMUNICATION

CROSS-REFERENCE TO RELATED APPLICATIONS

This application is a Submission Under 35 U.S.C. § 371 for U.S. National Stage Patent Application of International Application Number: PCT/SE2016/051069, filed Nov. 1, 2016 entitled "SYNCHRONIZATION-DEPENDENT TRANSMISSION FOR VEHICLE TO ANYTHING COMMUNICATION," which claims priority to U.S. Provisional Application No. 62/251,418, filed Nov. 5, 2015, entitled "SYNCHRONIZATION-DEPENDENT TRANSMISSION FOR V2X," the entirety of both which are incorporated herein by reference.

TECHNICAL FIELD

The present disclosure relates to the resource management of radio communication networks and more specifically to a method and wireless device for selecting transmission parameters for a wireless device in a device-to-device (D2D) communication system.

BACKGROUND

It is estimated that by 2020 there will be some 33 million automotive vehicles sold annually with built-in wireless connectivity, generating more than 163 million terabytes of data each year via their dozens of on-board cameras and sensor technologies. When shared across a wireless network, this data can be utilized by vehicles to give them an awareness of road conditions beyond the reach of their sensors, and thus enable the driver or the vehicle itself to better plan driving maneuvers. Vehicle to Vehicle (V2V) communications is a subset of device to device (D2D) wireless technology designed to allow automobiles to "talk" to each other.

Release 12 of the Long Term Evolution (LTE) wireless communication standard has been extended to support device to device (D2D) communications features targeting both commercial and public safety applications. Some applications enabled by Rel-12 LTE include device discovery, where a device is able to sense the proximity of another device and associated applications by broadcasting and detecting discovery messages that carry device and application identities. Another application includes direct communication based on physical channels terminated directly between devices.

One potential extension for device to device communication includes support of V2x communication (Vehicle to "anything"), where "x" includes any combination of direct communication between vehicles, pedestrians and infrastructure. V2x communications may enable forward collision warning, traffic queue warning, vulnerable road user alerts, do not pass warnings, curve speed warnings, blind intersection warnings, emergency vehicle alerts, etc. For example, V2x communication may take advantage of a network (NW) infrastructure, when available, but basic V2x connectivity should be possible even in case of lack of network coverage. Providing an LTE-based V2x interface may be economically advantageous because of LTE economies of scale and it may enable tighter integration between communications with the network infrastructure (V2I, vehicle to infrastructure) and vehicle to pedestrian (V2P) and V2V communications, as compared to using a dedicated V2x technology.

V2x communications may carry both non-safety and safety information, where each of the applications and services may be associated with specific requirements, e.g., latency, reliability, capacity, etc. European Telecommunication Standards Institute (ETSI) has defined two types of messages for road safety: Co-operative Awareness Message (CAM) and Decentralized Environmental Notification Message (DENM).

CAM: The CAM message is intended to enable vehicles, including emergency vehicles, to notify their presence and other relevant parameters in a broadcast fashion. Such messages target other vehicles, pedestrians, and infrastructure, and are handled by their applications. The CAM message also serves as active assistance to safety driving for normal traffic. The availability of a CAM message is checked every 100 ms, yielding a maximum detection latency requirement of <=100 ms for most messages. However, the latency requirement for pre-crash sensing warning is 50 ms.

DENM: The DENM message is event-triggered, such as by braking, and the availability of a DENM message is also checked every 100 ms, and the requirement of maximum latency is <=100 ms.

The package size of CAM and DENM messages varies from 100+ to 800+ bytes and the typical size is about 300 bytes. The message is supposed to be detected by all vehicles in proximity. The SAE (Society of Automotive Engineers) has also defined the Basic Safety Message (BSM) for dedicated short range communication (DSRC) with various messages sizes defined. According to the importance and urgency of the messages, the BSMs are further classified into different priorities.

Existing communication systems rely on tight requirements for frequency and timing synchronization between transmitter and receiver. This synchronization is usually provided by the network through connectivity, using appropriate signaling.

For V2x communication, synchronization may be acquired from the cellular network (i.e., as in cellular communications), from other devices, or from Global Navigation Satellite System (GNSS) (e.g., through an absolute time reference like Coordinated Universal Time (UTC)). Synchronization may be maintained for a limited time by the wireless device by use of its internal clock. It is understood that the internal clock may result in a drift that is larger than the one typically occurring when the wireless device derives synchronization from an external source. Given the nature of V2x communications, it is likely that wireless devices will lose connectivity to the external source of synchronization at some point, even if only for a short time. This loss of connectivity may be total (e.g., absence of cellular or satellite coverage) or only partial (e.g., receiving only from a few satellites). If the transmitter is not properly synchronized to the receiver, it is likely that the transmission will fail.

SUMMARY

Some embodiments advantageously provide a wireless device and a method for use in a wireless device for selecting a transmission parameter of a first wireless device in a wireless communication network. According to this aspect, a method includes selecting at least one transmission parameter based at least upon an estimated level of synchronization for the first wireless device. The method further includes transmitting a packet to at least a second wireless device using the selected at least one transmission parameter.

According to this aspect, in some embodiments, the method further includes estimating a level of synchronization for the first wireless device. In some embodiments, the method further includes establishing a connection to a synchronization source. In some embodiments, estimating the level of synchronization for the wireless device is based at least upon a degree of synchronization accuracy that can be obtained when the synchronization source connection is established. In some embodiments, estimating the level of synchronization for the wireless device is based at least upon a characteristic of the synchronization source. In some embodiments, estimating the level of synchronization for the wireless device is based at least upon a type of synchronization source.

In some embodiments, selecting the at least one transmission parameter based on the estimated level of synchronization comprises selecting the at least one transmission parameter based upon the type of the synchronization source. In some embodiments, the synchronization source or type of synchronization source is one or more of a Global Navigation Satellite System (GNSS), a base station and at least one wireless device configured to transmit synchronization signals. In some embodiments, the at least one transmission parameter is selected based upon a number of synchronization sources. In some embodiments, the synchronization source is a Global Navigation Satellite System (GNSS) and the degree of synchronization accuracy is based on a number of tracked satellites in the GNSS. In some embodiments, the synchronization source is a Global Navigation Satellite System (GNSS) and the degree of synchronization accuracy is based on an amount of power received from at least one satellite in the GNSS. In some embodiments, the synchronization source is a Global Navigation Satellite System (GNSS) and the degree of synchronization accuracy is based on a status of a detection indicator. In some embodiments, the synchronization source is a base station and the degree of synchronization accuracy is based on variations in at least one of a time and a frequency reference.

In some embodiments, the method includes establishing a wireless connection to more than one synchronization source, wherein each of the more than one synchronization source is assigned a priority level. In some embodiments, the selection of the at least one transmission parameter includes at least one of choosing a transmission format, selecting a reference signal format and selecting a cyclic prefix. In some embodiments, the selected transmission format is one of a transport block size, a size of packets to be transmitted, a modulation and coding scheme, an amount of physical resources, a number of resource blocks, a number of transmission subframes, a number of retransmissions and an antenna mapping. In some embodiments, selecting the at least one transmission parameter based at least upon the estimated level of synchronization includes selecting a bandwidth. In some embodiments, selecting the at least one transmission parameter based at least upon the estimated level of synchronization includes selecting a number of retransmissions.

In some embodiments, selecting the at least one transmission parameter based at least upon the estimated level of synchronization includes selecting a number of resource blocks associated with the transmission of a packet to at least a second wireless device using the selected at least one parameter. In some embodiments, selecting the at least one transmission parameter based at least upon the estimated level of synchronization includes selecting a modulation and coding scheme (MCS). In some embodiments, in some embodiments, selecting the at least one transmission parameter based at least upon the estimated level of synchronization includes selecting a format of the packet. In some embodiments, the wireless communication network is a D2D communication network.

According to yet another aspect, a first wireless device is configured to select a transmission parameter in a wireless communication network. The first wireless device includes processing circuitry configured to select at least one transmission parameter based at least upon an estimated level of synchronization for the first wireless device. The first wireless device further includes a communication interface configured to transmit a packet to at least a second wireless device using the selected at least one transmission parameter.

In some embodiments, the processor is further configured to estimate a level of synchronization for the first wireless device. In some embodiments, the processor is further configured to establish a connection to a synchronization source. In some embodiments, estimating the level of synchronization for the first wireless device is based at least upon a degree of synchronization accuracy that can be obtained when the synchronization source connection is established.

In some embodiments, estimating the level of synchronization for the wireless device is based at least upon a characteristic of the synchronization source. In some embodiments, estimating the level of synchronization for the wireless device is based at least upon a type the synchronization source. In some embodiments, selecting the at least one transmission parameter based on the estimated level of synchronization comprises selecting the at least one transmission parameter based upon the type of the synchronization source.

In some embodiments, the synchronization source is one or more of a Global Navigation Satellite System (GNSS), a base station or an evolved NodeB (eNB) and at least one wireless device configured to transmit synchronization signals. In some embodiments, the at least one transmission parameter is selected based upon a number of synchronization sources. In some embodiments, the synchronization source is a Global Navigation Satellite System (GNSS) and the degree of synchronization accuracy is based on a number of tracked satellites in the GNSS. In some embodiments, the synchronization source is a Global Navigation Satellite System (GNSS) and the degree of synchronization accuracy is based on an amount of power received from at least one satellite in the GNSS. In some embodiments, the synchronization source is a Global Navigation Satellite System (GNSS) and the degree of synchronization accuracy is based on a status of a detection indicator. In some embodiments, the synchronization source is a network entity and the degree of synchronization accuracy is based on variations in at least one of a time and a frequency reference.

In some embodiments, the processor is further configured to establish a wireless connection to more than one synchronization source, wherein each of the more than one synchronization source is assigned a priority level. In some embodiments, the selection of the at least one transmission parameter includes choosing a transmission format. In some embodiments, the selected transmission format is one of a transport block size, a size of packets to be transmitted, a modulation and coding scheme, an amount of physical resources, a number of resource blocks, a number of transmission subframes, a number of retransmissions and an antenna mapping.

In some embodiments, selecting the at least one transmission parameter based at least upon the estimated level of synchronization includes selecting a bandwidth. In some embodiments, selecting the at least one transmission parameter based at least upon the estimated level of synchronization includes selecting a number of retransmissions. In some embodiments, selecting the at least one transmission parameter based at least upon the estimated level of synchronization includes selecting a number of resource blocks associated with the transmission of a packet to at least a second wireless device using the selected at least one parameter. In some embodiments, selecting the at least one transmission parameter based at least upon the estimated level of synchronization includes selecting a modulation and coding scheme (MCS). In some embodiments, selecting the at least one transmission parameter based at least upon the estimated level of synchronization includes selecting a format of the packet. In some embodiments the wireless communication network is a D2D communication network.

According to another aspect, a first wireless device is configured to adaptively select a transmission parameter in a device-to-device (D2D) communication network. The first wireless device includes a synchronization estimating module configured to estimate a level of synchronization for the first wireless device. In some embodiments, the first wireless device includes a transmission parameter selection module configured to select at least one transmission parameter based at least upon the estimated level of synchronization. In some embodiments, the first wireless device includes a communication module configured to transmit a data packet to a second wireless device using the selected at least one transmission parameter.

According to another aspect, a computer program includes computer program code which, when executed in a wireless device, causes the wireless device to execute the methods according select a transmission parameter in a D2D communication network. The computer code may be stored on a computer readable storage medium.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
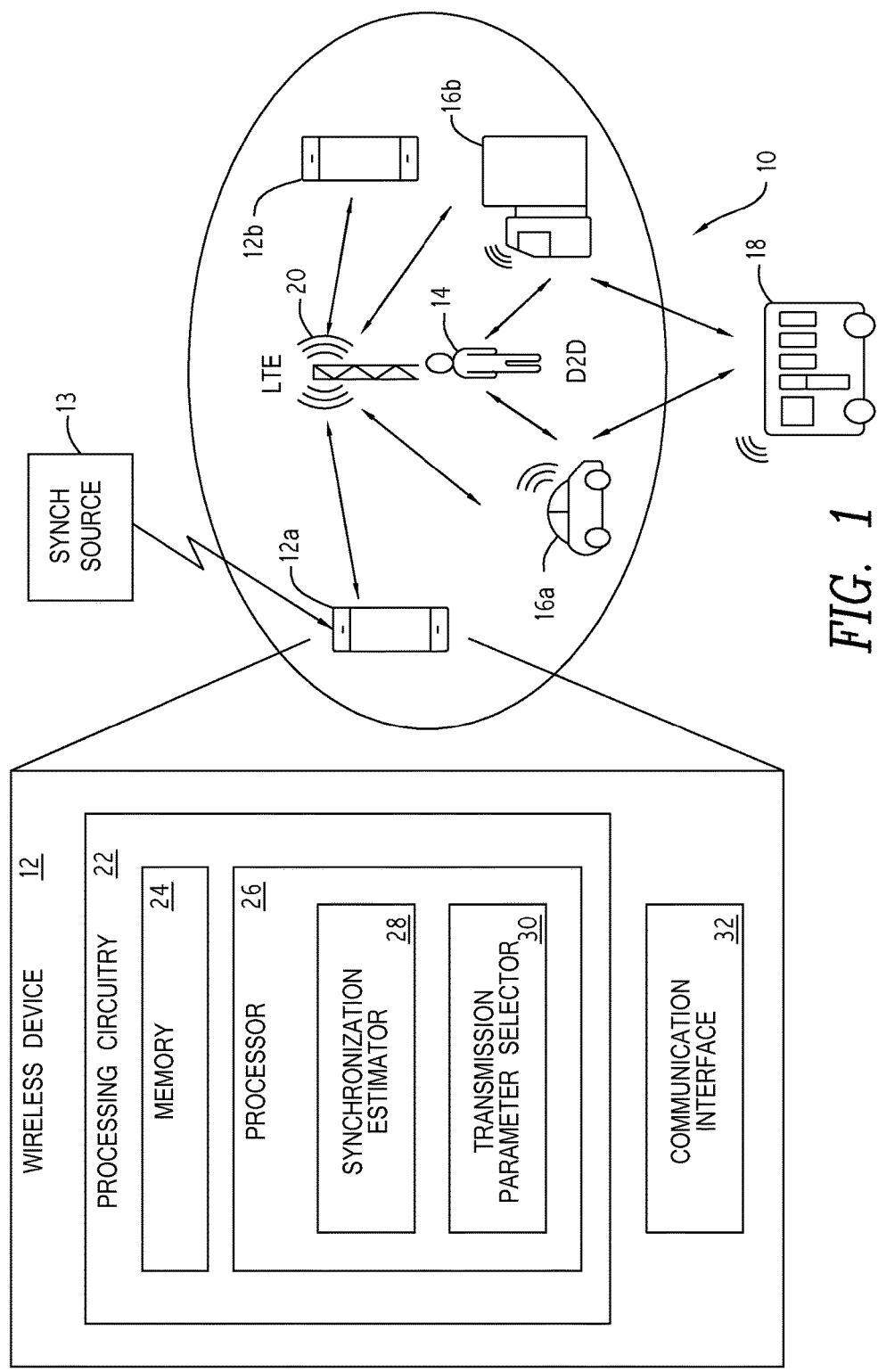
FIG. 1 is a diagram of a wireless communication network including device-to-device (D2D) communication including a block diagram of a wireless device capable of D2D communication.

Before describing in detail exemplary embodiments, it is noted that the embodiments reside primarily in combinations of apparatus components and processing steps related to resource management of radio communication networks with participation of vehicles. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

The present disclosure relates generally to the resource management of radio communication networks with participation in vehicles. The method and arrangements disclosed herein may be used for cellular or direct communication in general. The methods and arrangements of the present disclosure include adaptively selecting communication parameters such as the transmission format or the message fields based on a level of synchronization of the wireless device. This results in improved link and system level performance as compared with known arrangements.

The present disclosure is in the context of D2D (sometimes called sidelink, peer to peer, or ProSe) and particularly V2V systems. However, some of the embodiments herein are applicable for communication among any type of network entities, including V2I and V2P and including uplink from some devices to a central control node.

D2D communications are currently under study and standardization as a technology enabler for V2V communication systems. Acquiring accurate timing and frequency synchronization is critical in D2D communications since the traditional sources of synchronization, e.g., a network (NW) entity such as a base station or an LTE enhanced node B (eNB), are sometimes not involved in the communication (e.g., if the network entities are out of coverage). This is relevant in V2V communications for two reasons: first, some wireless devices travel at high speeds resulting in Doppler spread of the signals; and second, the bands dedicated to intelligent transport systems (ITS) are placed at much higher frequencies than those of traditional cellular NWs.

Currently, at least two alternatives are being considered as sources of synchronization for V2x wireless devices: base stations, such as eNBs and GNSS. In the first case, the wireless device derives synchronization from the eNB through some specific signaling (e.g., synchronization signals). In the second case, the wireless device derives synchronization from the signal transmitted by one or more satellites (e.g., through an absolute timing reference like UTC). Additional synchronization methods including using other wireless devices as synchronization sources (references) may also be considered, wherein the synchronization source may be another wireless device, such as a cluster head. Thus, another synchronization source might be one or more wireless devices simultaneously transmitting synchronization signals such as sidelink synchronization signals (SLSS).

It is also possible that a wireless device may use more than one source of synchronization. For example, the wireless device may simultaneously use eNB-derived and GNSS-derived synchronization, e.g., one for timing and the other one for frequency synchronization. Alternatively, the wireless device may use the different sources of synchronization according to some list of priorities. In any case, connectivity between a wireless device and its source of synchronization may be reduced or lost. Nevertheless, wireless devices should still be able to transmit messages, in particular for safety applications such as CAM and DENM. Synchronization is used among others for aligning the timing of transmission and/or reception of the wireless device, as well as controlling the frequency of the oscillators used for transmission and/or demodulation.

Referring now to the drawing figures, where like reference designators refer to like elements, there is shown an embodiment of a D2D network designated D2D network 10. In FIG. 1, wireless devices 12a and 12b, referred to collectively herein as wireless devices 12, are shown separately for simplicity. The pedestrian 14 or any of the vehicles depicted in FIG. 1 may communicate with each other via a wireless device 12. The pedestrian 14, vehicles 16a and 16b (collectively referred to as "vehicle 16") and infrastructure 18 shown in FIG. 1 each may each include or use a wireless device 12. As used herein, wireless device 12 is not limited to a user equipment (UE). A wireless device is any type of device that is configured or configurable for communication through wireless communication. Examples of such wireless devices are sensors, modems, smart phones, machine type (MTC) devices a.k.a. machine to machine (M2M) devices, PDAs, iPADs, Tablets, smart phones, laptop embedded equipped (LEE), laptop mounted equipment (LME), USB dongles, etc. In D2D network 10, two or more wireless devices 12 directly communicate with each other without having the payload traverse the backhaul network.

In cellular network assisted D2D communications, wireless devices 12 in the vicinity of each other can establish a direct radio link, i.e., a D2D bearer. While wireless devices 12 communicate over the D2D "direct" bearer, they also maintain a cellular connection with a network entity such as a base station 20, for example, an LTE eNB. The base station 20 serves wireless devices 12 in a region of coverage of the base station 20.

A message transmitted or received by a wireless device 12 that is out of synchronization may be prone to decoding errors. For example, timing misalignments may break the subcarrier orthogonality. Similarly, frequency misalignments may degrade the performance of the channel estimation. In either case, decoding errors may happen.

One way to combat the errors due to timing and frequency misalignments is by selecting transmission parameters that make the communication more robust against these impairments. In one embodiment of the present disclosure, methods and arrangements are disclosed for estimating the level of synchronization of the wireless device 12, selecting the most suitable transmission parameters based on, for example, the packet's characteristics and traffic requirements as well as on the estimated level of synchronization, and transmitting the packet using the selected transmission parameters. As used herein, the term synchronization refers to timing and/or frequency synchronization with a source. Further, the phrase "level of synchronization" refers to an amount or a degree of synchronization accuracy (e.g., time and/or frequency synchronization) that can be obtained when a certain synchronization source is selected. The level of synchronization is thus dependent on the synchronization source, and selecting a transmission parameter based upon the estimated level of synchronization could be selecting a transmission parameter based on the synchronization source, such as the type of synchronization source.

In some embodiments, estimating the level of synchronization for the wireless device is based at least upon a degree of synchronization accuracy that can be obtained when the synchronization source connection is established. In some embodiments, the synchronization source is a Global Navigation Satellite System (GNSS) and the degree of synchronization accuracy is based on a number of tracked satellites in the GNSS. In some embodiments, the degree of synchronization accuracy is based on an amount of power received from at least one satellite in the GNSS. In some embodiments, the degree of synchronization accuracy is based on a status of a detection indicator. In some embodiments, the synchronization source is a network entity, such as a base station, and the degree of synchronization accuracy is based on variations in at least one of a time and a frequency reference. In some embodiments, the level of synchronization depends on the source of the synchronization. In particular, the level of synchronization for the first wireless device is in relation to at least one synchronization source.

Figure 3:
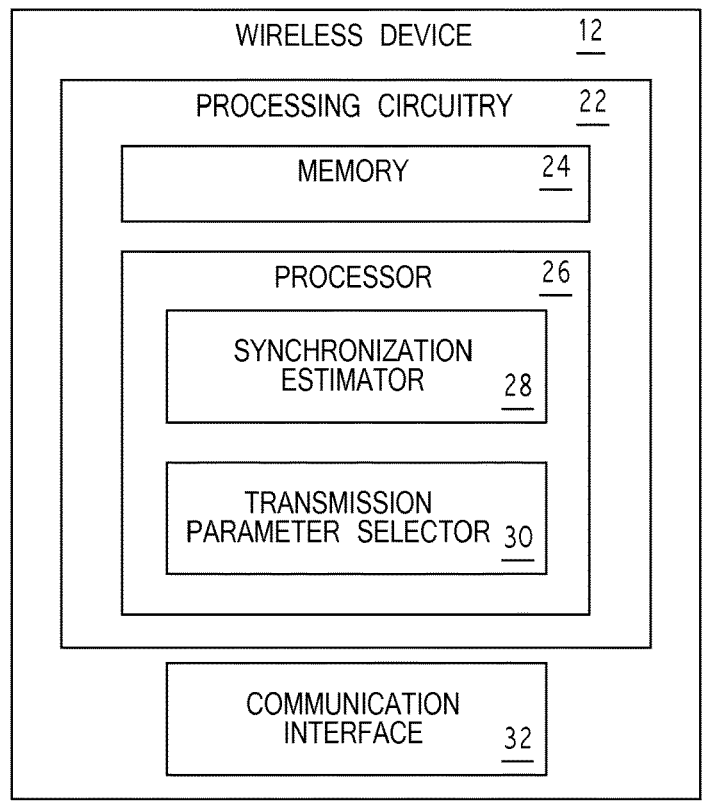
FIG. 3 is a block diagram of a wireless device configured to select a synchronization-dependent transmission parameter.

In FIG. 1 and FIG. 3, wireless device 12, which could be a wireless device held by pedestrian 14 or contained within vehicle 16a or 16b (referred to herein collectively as vehicles 16) or infrastructure 18, includes processing circuitry 22 having a memory 24 in communication with a processor 26. The processor 26 may be configured to perform a series of functions based, for example, in programmatic code stored in memory 24. These functions may include estimating a level of synchronization for the wireless device 12, performed by synchronization estimator 28 and selecting at least one transmission parameter based at least upon the estimated level of synchronization performed by transmission parameter selector 30. A communication interface 32 is configured to transmit a data packet to a second wireless device 12 using the selected at least one transmission parameter. This step includes signaling the transmission parameters to the other wireless devices 12. Note that the term, selecting, may include obtaining and/or calculating. Note also that determining or estimating a level of synchronization may include determining a synchronization source and basing the determination or estimate upon the synchronization source or the type of synchronization source. As an example, the type of synchronization source may thus be a satellite system (GNSS) or a base station (eNB). Another wireless device, such as a cluster head, could also be used as a synchronization source. Another synchronization source example is one or more wireless devices simultaneously transmitting synchronization signals such as sidelink synchronization signals (SLSS).

Figure 2:
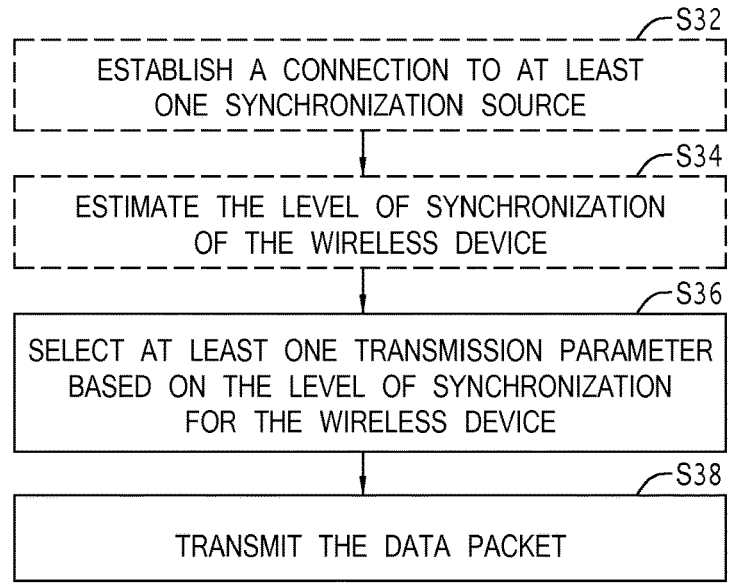
FIG. 2 is a flowchart of an exemplary process for selecting a transmission parameter of a first wireless device in a wireless communication network.

The method performed by processor 26 and communication interface 32 of first wireless device 12a is illustrated in FIG. 2. In FIG. 2, optionally, synchronization to at least one synchronization source 13 is established (block S32). Optionally, information about the level of synchronization of wireless device 12a is estimated (block S34). A selection of the transmission parameters is made based on the level of synchronization of the wireless device 12a (block S36). The data packet is then transmitted to a second wireless device 12b, (block S38). The data packet may include control data or communications information.

Figure 5:
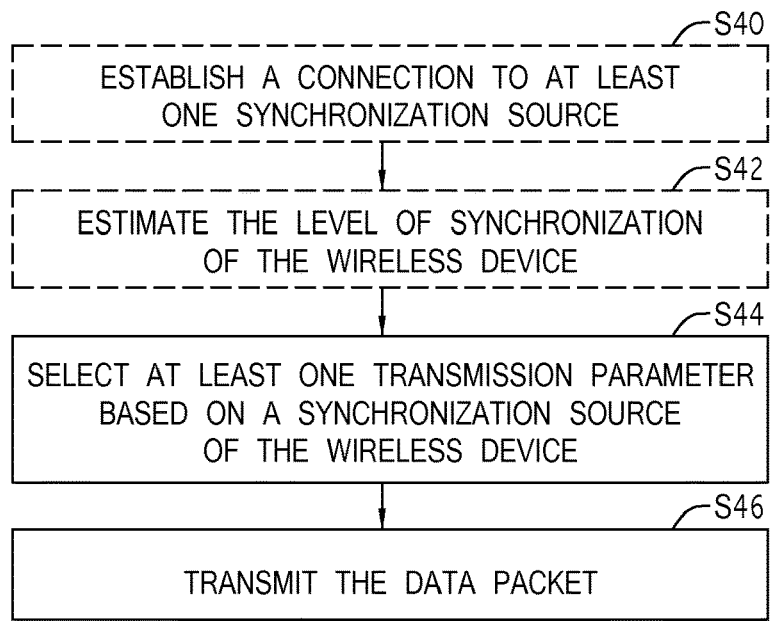
FIG. 5 is a flowchart of an exemplary process of an embodiment for selecting a transmission parameter of a first wireless device in a wireless communication network based on the level of synchronization wherein the selecting is based on a (type of) synchronization source.

An embodiment of the method performed by processor 26 and communication interface 32 of a first wireless device 12a is illustrated in FIG. 5. In FIG. 5, optionally, synchronization to at least one synchronization source 13 is established (block S40). Optionally, information about the level of synchronization of the first wireless device 12a is estimated (block S42), wherein estimating the level of synchronizations includes determining a (type of) synchronization source to which the first wireless device 12a is synchronized. A selection of the transmission parameters is made based on the level of synchronization of the first wireless device 12a (block S44), which includes selecting the transmission parameter based on the (type of) synchronization source. The data packet is then transmitted to a second wireless device 12b, (block S46). The data packet may include control data or communications information.

Figure 6:
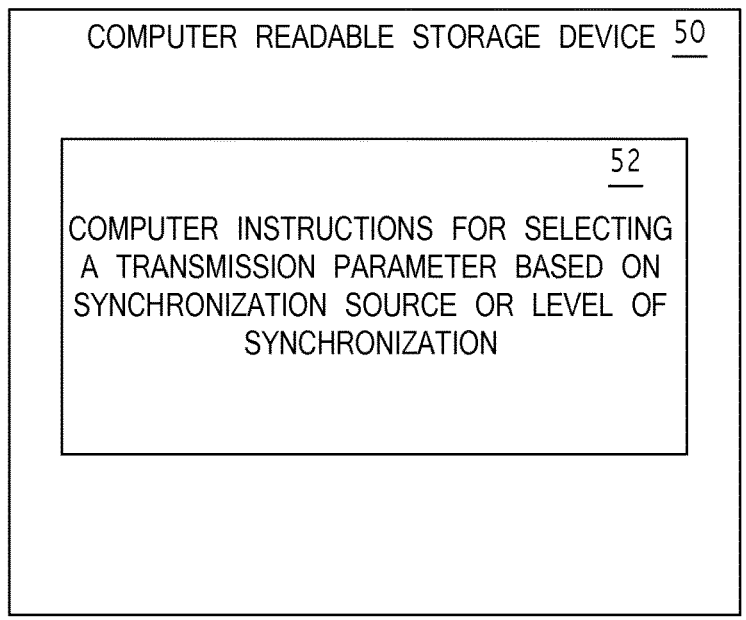
FIG. 6 is an illustration of a computer readable storage medium.

FIG. 6 depicts an illustration of a computer readable storage medium 50 according to the invention, able to store thereon a computer program 52 for executing the method of selecting at least one transmission parameter.

Estimation of the Level of Synchronization

In one embodiment, wireless device 12 may use its level of connectivity to the sources of synchronization as an indicator of the level of synchronization. For example, if synchronization is derived from GNSS, wireless device 12 may use the number of tracked satellites or their received power or a successful detection indicator (e.g. a checksum) as an indicator of connectivity. If synchronization is derived from the network, wireless device 12 may estimate the level of time/frequency synchronization by tracking the variations in the time/frequency reference (e.g., repeated large-magnitude variations may indicate a low level of synchronization). In another embodiment, if synchronization is derived from the network, wireless device 12 may declare that the level of synchronization is low when changing serving network entities 20.

A wireless device 12 may combine several sources of synchronization and/or several such mechanisms for each source of synchronization. In another embodiment, if wireless device 12 has a list of priorities for the different sources of synchronization, it may use some transmission parameters with the preferred source of synchronization, switch to another set of parameters with the second source of synchronization in the list of preference, and so on. In another embodiment, wireless device 12 may use knowledge of the communication scenario to estimate the level of synchronization. For example, a wireless device 12 equipped with road maps may assume that network entity/GNSS coverage is always lost in tunnels, or underground garages.

Selection of Transmission Parameters

In some embodiments, the selection of the transmissions parameters may include choosing an appropriate transmission format for the data packet. For example, a wireless device may adapt modulation and coding scheme, such as for example use a lower coding rate (i.e., provide more redundancy); or may choose a lower-order modulation which is less sensitive to channel-estimation errors; or the wireless device may choose a larger number of retransmissions. Thus, selecting a transmission parameters may be choosing a transmission format, such as a modulation and coding scheme or a number of retransmissions. In some other embodiments, the selection of the transmission parameters may consist of selecting a reference signal format that is more suitable for large synchronization errors, or it may select a longer cyclic prefix. Thus, selecting a transmission parameter includes choosing a transmission format, selecting a reference signal format and selecting a cyclic prefix. These are examples of applications at OSI Layers 1 and/or 2. In some embodiments, selecting a transmission parameter may include modifying a number of resource blocks associated with the transmission. In some embodiments, selecting a transmission parameter includes selecting a coding rate. Also, in some embodiments, the chosen transmission format may be a number of resource blocks, a number of transmission subframes or an amount of physical resources. A number of transmission subframes could be a number of transmissions of a packet, i.e., the transmission and retransmissions of the packet.

In other embodiments, wireless device 12 may modify the data packet. For example, wireless device 12 may discard some of the fields while keeping only the fields that are desired or needed. This is an example of use of the methods and arrangements of the present disclosure at the application layer.

Signaling the Transmission Parameters to the Receiver

In the Rel-12/13 D2D communication standards, the transmitter of the wireless device, such as a transmitter in the communication interface 32 uses a scheduling assignment (SA) to notify the potential receivers about at least some of the transmission parameters (e.g., Modulation and Coding Scheme (MCS), bandwidth, etc.). This mechanism may be used for V2V communications, possibly with some variations (e.g., the SA may be transmitted simultaneously with the data packet, possibly in the same radio resources, i.e., in-band). In some embodiments, the transmitting wireless device 12 uses SAs to include the selected transmission parameters. In some other embodiments (e.g. cellular), the transmitter may use specific L1/L2 signaling to notify the receiver about the new transmission format.

FIG. 3 is a block diagram of a wireless device 12 configured to adaptively select a transmission format for the wireless device 12 in a D2D communication network according to an embodiment of the present disclosure. Wireless device 12 includes processing circuitry 22, which includes memory 24 and processor 26, the memory 24 in communication with processor 26. Processing circuitry 22 may comprise and/or be connected to and/or be configured for accessing (e.g., writing to and/or reading from) memory 24, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by control circuitry and/or other data, e.g., data pertaining to communication, e.g., configuration and/or address data of nodes, etc. Processing circuitry 22 may be configured to control any of the methods described herein and/or to cause such methods to be performed, e.g., by processor 26. Corresponding instructions may be stored in the memory 24, which may be readable and/or readably connected to the processing circuitry 22. In other words, processing circuitry 22 may include a controller, which may comprise a microprocessor and/or microcontroller and/or FPGA (Field-Programmable Gate Array) device and/or ASIC (Application Specific Integrated Circuit) device. It may be considered that processing circuitry 22 includes or may be connected or connectable to memory, which may be configured to be accessible for reading and/or writing by the controller and/or processing circuitry 22.

Memory 24 includes instructions that, when executed by processor 26, configure processor 26 to estimate a level of synchronization for the first wireless device, which can be performed by synchronization estimator 28, and to select at least one transmission parameter based at least upon the estimated level of synchronization, which can be performed by transmission parameter selector 30. Wireless device 12 also includes a communication interface 32 configured to transmit a data packet to a second wireless device using the selected at least one transmission parameter.

Figure 4:
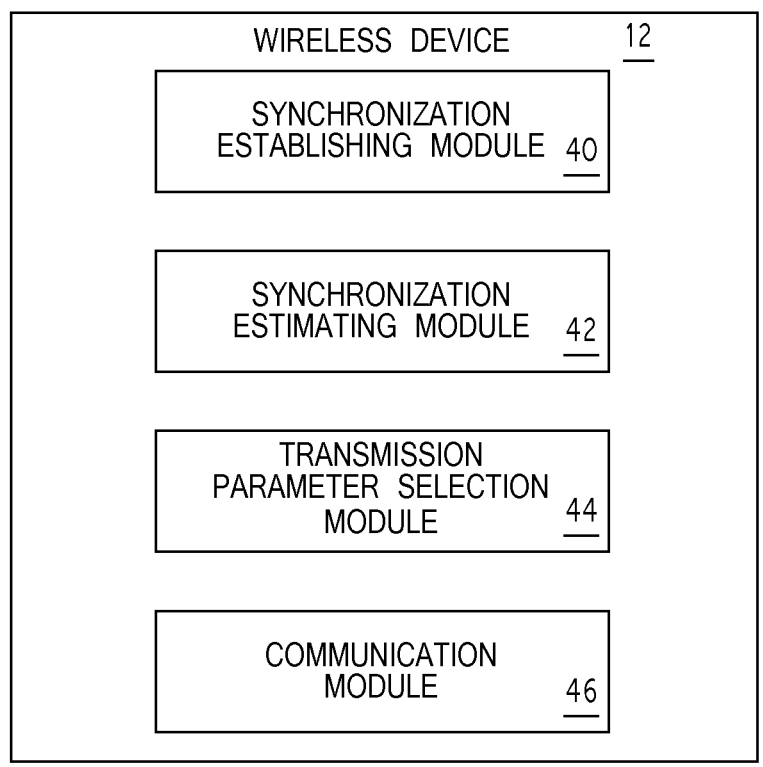
FIG. 4 is block diagram of an alternative embodiment of the wireless device capable of D2D communication.

FIG. 4 is a block diagram of a wireless device 12 configured to adaptively select a transmission format for the wireless device 12 in a D2D communication network according to an alternate embodiment of the present disclosure. In FIG. 4, wireless device 12 includes a synchronization establishing module 40 configured to establish a synchronization for the first wireless device to a synchronization source, a synchronization estimating module 42 configured to estimate a level of synchronization for the first wireless device, a transmission parameter selection module 44 configured to select at least one transmission parameter based at least upon the estimated level of synchronization, and a communication module 46 configured to transmit a data packet to a second wireless device using the selected at least one transmission parameter. The modules of FIG. 4 may contain software that, when executed by a processor, cause the processor to execute the functions of synchronization estimation, transmission parameter selection, and communication.

Thus, in some embodiments, a method for adaptively selecting a transmission format of a first wireless device in a device-to-device (D2D) communication network is provided. The method includes estimating a level of synchronization for the first wireless device, selecting at least one transmission parameter based at least upon the estimated level of synchronization, transmitting a data packet to a second wireless device using the selected at least one transmission parameter.

In some embodiments, the at least one transmission parameter is based on characteristics of the transmitted data packet. In some embodiments, selecting the at least one transmission parameter is based on traffic requirements of the D2D communication network. In some embodiments, the method further includes transmitting, to the second wireless device, information about the at least one transmission parameter. In some embodiments, the information about the at least one transmission parameter is transmitted to the second wireless device with the data packet. In some embodiments, the method further includes establishing a connection to a synchronization source, and wherein estimating the level of synchronization for the wireless device is based at least upon a degree of synchronization accuracy that can be obtained when the synchronization source connection is established. In some embodiments, the synchronization source is a Global Navigation Satellite System (GNSS) and the degree of synchronization accuracy is based on a number of tracked satellites in the GNSS. In some embodiments, the synchronization source is a Global Navigation Satellite System (GNSS) and the degree of synchronization accuracy is based on an amount of power received from at least one satellite in the GNSS. In some embodiments, the synchronization source is a Global Navigation Satellite System (GNSS) and the degree of synchronization accuracy is based on a status of a detection indicator. In some embodiments, the synchronization source is a network entity and the degree of synchronization accuracy is based on variations in at least one of a time and a frequency reference. In some embodiments, the method further includes establishing a connection to more than one synchronization source, wherein each of the more than one synchronization source is assigned a priority level. In some embodiments, the at least one transmission parameter is selected according to the assigned priority level. In some embodiments, estimating the level of synchronization for the wireless device is based at least upon a characteristic of the synchronization source. A characteristic of the synchronization source may be for example the type of synchronization source. In some embodiments, selecting the at least one transmission parameter based at least upon the estimated level of synchronization includes modifying a format of the data packet. In some embodiments, selecting the at least one transmission parameter based at least upon the estimated level of synchronization includes selecting a coding rate. In some embodiments, selecting the at least one transmission parameter based at least upon the estimated level of synchronization includes selecting a modulation for transmission of the data packet.

In some embodiments, a first wireless device configured to adaptively select a transmission format in a device-to-device (D2D) communication network is provided. The first wireless device includes processing circuitry including a memory and a processor, the memory in communication with the processor. The memory has instructions that, when executed by the processor, configure the processor to estimate a level of synchronization for the first wireless device, select at least one transmission parameter based at least upon the estimated level of synchronization, and a communication interface configured to transmit a data packet to a second wireless device using the selected at least one transmission parameter. In some embodiments, selecting the at least one transmission parameter is based on characteristics of the transmitted data packet. In some embodiments, selecting the at least one transmission parameter is based on traffic requirements of the D2D communication network. In some embodiments, the processor is further configured to transmit, to the second wireless device, information about the at least one transmission parameter. In some embodiments, the information about the at least one transmission parameter is transmitted to the second wireless device with the data packet. In some embodiments, the processor is further configured to establish a connection to a synchronization source, and wherein estimating the level of synchronization for the first wireless device is based at least upon a degree of synchronization accuracy that can be obtained when the synchronization source connection is established. In some embodiments, the synchronization source is a Global Navigation Satellite System (GNSS) and the degree of synchronization accuracy is based on a number of tracked satellites in the GNSS. In some embodiments, the synchronization source is a Global Navigation Satellite System (GNSS) and the degree of synchronization accuracy is based on an amount of power received from at least one satellite in the GNSS. In some embodiments, the synchronization source is a Global Navigation Satellite System (GNSS) and the degree of synchronization accuracy is based on a status of a detection indicator. In some embodiments, the synchronization source is a network entity and the degree of synchronization accuracy is based on variations in at least one of a time and a frequency reference.

Some other embodiments are as follows:

Embodiment 1

A method for adaptively selecting a transmission format of a first wireless device in a device-to-device (D2D) communication network, the method comprising:
  estimating a level of synchronization for the first wireless device;
  selecting at least one transmission parameter based at least upon the estimated level of synchronization; and transmitting a data packet to a second wireless device using the selected at least one transmission parameter.

Embodiment 2

The method of Embodiment 1, wherein selecting the at least one transmission parameter is based on characteristics of the transmitted data packet.

Embodiment 3

The method of Embodiment 1, wherein selecting the at least one transmission parameter is based on traffic requirements of the D2D communication network.

Embodiment 4

The method of Embodiment 1, further comprising transmitting, to the second wireless device, information about the at least one transmission parameter.

Embodiment 5

The method of Embodiment 4, wherein the information about the at least one transmission parameter is transmitted to the second wireless device with the data packet.

Embodiment 6

The method of Embodiment 1, further comprising establishing a connection to a synchronization source, and wherein estimating the level of synchronization for the wireless device is based at least upon a degree of synchronization accuracy that can be obtained when the synchronization source connection is established.

Embodiment 7

The method of Embodiment 6, wherein the synchronization source is a Global Navigation Satellite System (GNSS) and the degree of synchronization accuracy is based on a number of tracked satellites in the GNSS.

Embodiment 8

The method of Embodiment 6, wherein the synchronization source is a Global Navigation Satellite System (GNSS) and the degree of synchronization accuracy is based on an amount of power received from at least one satellite in the GNSS.

Embodiment 9

The method of Embodiment 6, wherein the synchronization source is a Global Navigation Satellite System (GNSS) and the degree of synchronization accuracy is based on a status of a detection indicator.

Embodiment 10

The method of Embodiment 6, wherein the synchronization source is a network entity and the degree of synchronization accuracy is based on variations in at least one of a time and a frequency reference.

Embodiment 11

The method of Embodiment 1, further comprising establishing a connection to more than one synchronization source, wherein each of the more than one synchronization source is assigned a priority level.

Embodiment 12

The method of Embodiment 11, wherein the at least one transmission parameter is selected according to the assigned priority level.

Embodiment 13

The method of Embodiment 6, wherein estimating the level of synchronization for the wireless device is based at least upon a characteristic of the synchronization source.

Embodiment 14

The method of Embodiment 1, wherein selecting the at least one transmission parameter based at least upon the estimated level of synchronization includes modifying a format of the data packet.

Embodiment 15

The method of Embodiment 1, wherein selecting the at least one transmission parameter based at least upon the estimated level of synchronization includes selecting a coding rate.

Embodiment 16

The method of Embodiment 1, wherein selecting the at least one transmission parameter based at least upon the estimated level of synchronization includes selecting a modulation for transmission of the data packet.

Embodiment 17

A first wireless device configured to adaptively select a transmission format in a device-to-device (D2D) communication network, the first wireless device comprising:
  processing circuitry including a memory and a processor, the memory in communication with the processor, the memory having instructions that, when executed by the processor, configure the processor to:
    estimate a level of synchronization for the first wireless device; and
  select at least one transmission parameter based at least upon the estimated level of synchronization; and
  a communication interface configured to transmit a data packet to a second wireless device using the selected at least one transmission parameter.

Embodiment 18

The first wireless device of Embodiment 17, wherein selecting the at least one transmission parameter is based on characteristics of the transmitted data packet.

Embodiment 19

The first wireless device of Embodiment 17, wherein selecting the at least one transmission parameter is based on traffic requirements of the D2D communication network.

Embodiment 20

The first wireless device of Embodiment 17, wherein the processor is further configured to transmit, to the second wireless device, information about the at least one transmission parameter.

Embodiment 21

The first wireless device of Embodiment 20, wherein the information about the at least one transmission parameter is transmitted to the second wireless device with the data packet.

Embodiment 22

The first wireless device of Embodiment 17, wherein the processor is further configured to establish a connection to a synchronization source, and wherein estimating the level of synchronization for the first wireless device is based at least upon a degree of synchronization accuracy that can be obtained when the synchronization source connection is established.

Embodiment 23

The first wireless device of Embodiment 22, wherein the synchronization source is a Global Navigation Satellite System (GNSS) and the degree of synchronization accuracy is based on a number of tracked satellites in the GNSS.

Embodiment 24

The first wireless device of Embodiment 22, wherein the synchronization source is a Global Navigation Satellite System (GNSS) and the degree of synchronization accuracy is based on an amount of power received from at least one satellite in the GNSS.

Embodiment 25

The first wireless device of Embodiment 22, wherein the synchronization source is a Global Navigation Satellite System (GNSS) and the degree of synchronization accuracy is based on a status of a detection indicator.

Embodiment 26

The first wireless device of Embodiment 22, wherein the synchronization source is a network entity and the degree of synchronization accuracy is based on variations in at least one of a time and a frequency reference.

Embodiment 27

The first wireless device of Embodiment 17, wherein the processor is further configured to establish a connection to more than one synchronization source, wherein each of the more than one synchronization source is assigned a priority level.

Embodiment 28

The first wireless device of Embodiment 27, wherein the at least one transmission parameter is selected according to the assigned priority level.

Embodiment 29

The first wireless device of Embodiment 22, wherein estimating the level of synchronization for the wireless device is based at least upon a characteristic of the synchronization source.

Embodiment 30

The first wireless device of Embodiment 22, wherein selecting the at least one transmission parameter based at least upon the estimated level of synchronization includes modifying a format of the data packet.

Embodiment 31

The first wireless device of Embodiment 17, wherein selecting the at least one transmission parameter based at least upon the estimated level of synchronization includes selecting a coding rate.

Embodiment 32

The first wireless device of Embodiment 17, wherein selecting the at least one transmission parameter based at least upon the estimated level of synchronization includes selecting a modulation for transmission of the data packet.

Embodiment 33

A first wireless device configured to adaptively select a transmission format in a device-to-device (D2D) communication network, the first wireless device comprising:
  a synchronization estimating module configured to estimate a level of synchronization for the first wireless device;
  a transmission parameter selection module configured to select at least one transmission parameter based at least upon the estimated level of synchronization; and
  a communication module configured to transmit a data packet to a second wireless device using the selected at least one transmission parameter.

Embodiment 34

The method of Embodiment 11, wherein the at least one transmission parameter is selected based upon a number of synchronization sources.

Embodiment 35

The first wireless device of Embodiment 27, wherein the at least one transmission parameter is selected based upon a number of synchronization sources.

Embodiment 36

The method of Embodiment 1, wherein selecting the at least one transmission parameter based at least upon the estimated level of synchronization includes selecting a bandwidth.

Embodiment 37

The first wireless device of Embodiment 17, wherein selecting the at least one transmission parameter based at least upon the estimated level of synchronization includes selecting a bandwidth.

Embodiment 38

The method of Embodiment 1, wherein selecting the at least one transmission parameter based at least upon the estimated level of synchronization includes selecting a number of retransmissions.

Embodiment 39

The first wireless device of Embodiment 7, wherein selecting the at least one transmission parameter based at least upon the estimated level of synchronization includes selecting a number of retransmissions.

Embodiment 40

The method of Embodiment 14, wherein modifying the format of the data packet includes discarding at least one field of the data packet.

Embodiment 41

The first wireless device of Embodiment 30, wherein modifying the format of the data packet includes discarding at least one field of the data packet.

Some embodiments advantageously provide a method for use in a first wireless device, and a first wireless device, for selecting a transmission parameter of a first wireless device (12) in a wireless communication network (10). According to this aspect, the method includes selecting at least one transmission parameter based at least upon an estimated level of synchronization for the first wireless device 12 (block S36), wherein the synchronization of the first wireless device is in relation to at least one synchronization source (13). The method may provide for adaptively selecting a transmission parameter, wherein the method can be adapted to the current situation regarding the level of synchronization.

According to this aspect, in some embodiments the method further includes transmitting a packet, such as a data packet or control information, to at least a second wireless device (12b) using the selected at least one transmission parameter (block S38). In some embodiments, the wireless communication network (10) is a device to device, D2D, communication network. In some embodiments, the method further includes estimating a level of synchronization for the first wireless device (12a) (block S34), wherein the estimating may be obtaining, determining, or calculating the level of synchronization, such as determining the type of synchronization source used.

In some embodiments, the method further includes establishing a connection to at least one synchronization source (13) (block S32). In some embodiments, the method further includes establishing a connection to a synchronization source (13), and wherein estimating the level of synchronization for the wireless device is based at least upon a degree of synchronization accuracy that can be obtained when the synchronization source connection is established. Thus, the level of synchronization in view of the degree of accuracy for the communication, such as transmitted and received packets, depends on the synchronization source. In some embodiments, estimating the level of synchronization for the wireless device (12a) is based at least upon a characteristic of the synchronization source (13). A characteristic of the synchronization source may be for example the type of synchronization source or a property of the synchronization source. In some embodiments, estimating the level of synchronization for the wireless device (12a) is based at least upon a type of synchronization source (13), or types of synchronization sources (13) if several sources are used, and the estimating of the level of synchronization may thus be the wireless device determining, checking, reading, or receiving information regarding what synchronization source(s) it uses.

In some embodiments, selecting the at least one transmission parameter based on the estimated level of synchronization comprises selecting the at least one transmission parameter based upon the type(s) of synchronization source(s) 13. In some embodiments, the synchronization source (13) is one or more of a Global Navigation Satellite System (GNSS) or a network entity, such as a base station 20 which may be, for example, an evolved NodeB (eNB). In some embodiments, the at least one transmission parameter is selected based upon a number of synchronization sources 13. In some embodiments, the synchronization source 13 is a Global Navigation Satellite System (GNSS) and the degree of synchronization accuracy is based on a number of tracked satellites in the GNSS. In some embodiments, the synchronization source 13 is a Global Navigation Satellite System (GNSS) and the degree of synchronization accuracy is based on an amount of power received from at least one satellite in the GNSS. In some embodiments, the synchronization source 13 is a Global Navigation Satellite System (GNSS) and the degree of synchronization accuracy is based on a status of a detection indicator. In some embodiments, the synchronization source 13 is a network entity and the degree of synchronization accuracy is based on variations in at least one of a time and a frequency reference.

In some embodiments, the method further includes establishing a connection to at least one synchronization source 13. In some embodiments, the method includes establishing a wireless connection to more than one synchronization source 13, wherein each of the more than one synchronization source 13 is assigned a priority level. In some embodiments, the selection of the at least one transmission parameter includes at least one of choosing a transmission format, selecting a reference signal format and selecting a cyclic prefix. In some embodiments, the selected transmission format is one of a transport block size, a size of packets to be transmitted, a modulation and coding scheme, an amount of physical resources, a number of resource blocks, a number of transmission subframes, a number of retransmissions and an antenna mapping. In some embodiments, selecting the at least one transmission parameter based at least upon the estimated level of synchronization (block S36) includes selecting a bandwidth. In some embodiments, selecting the at least one transmission parameter based at least upon the estimated level of synchronization (block S36) includes selecting a number of retransmissions.

In some embodiments, selecting the at least one transmission parameter based at least upon the estimated level of synchronization (block S36) includes selecting a number of resource blocks associated with the transmission of a packet to at least a second wireless device using the selected at least one parameter. In some embodiments, selecting the at least one transmission parameter based at least upon the estimated level of synchronization (block S36) includes selecting a modulation and coding scheme (MCS). In some embodiments, selecting the at least one transmission parameter based at least upon the estimated level of synchronization (block S36) includes selecting a format of the packet.

In a further aspect is provided a computer program comprising computer program code which, when executed in a wireless device, causes the wireless device to execute the methods described above. In yet a further aspect is provided a carrier, wherein the carrier is one of an electronic signal, optical signal, radio signal, or computer readable storage medium, such as a storage disk, storage device, CD-ROM or USB memory stick, containing or having stored thereon, the computer program described above.

According to yet another aspect, a first wireless device is configured to select a transmission parameter in a wireless communication network. The first wireless device 12 includes processing circuitry 22 configured to select at least one transmission parameter based at least upon an estimated level of synchronization for the first wireless device 12 (block S36). The processing circuitry 22 may include a memory 24 and processor 26, wherein the memory 24 is in communication with the processor 26, the memory 24 having instructions that, when executed by the processor 26, configure the processor 26 to select at least one transmission parameter.

According to this aspect, the first wireless device 12 further includes a communication interface configured to transmit a packet to at least a second wireless device using the selected at least one transmission parameter. In some embodiments, the wireless communication network is a device-to-device (D2D) communication network. In some embodiments, the processor is further configured to estimate a level of synchronization 28 for the first wireless device (block S34).

In some embodiments, the processor is further configured to establish a connection to a synchronization source 13, and wherein estimating the level of synchronization for the first wireless 12 device is based at least upon a degree of synchronization accuracy that can be obtained when the synchronization source 13 connection is established. In some embodiments, selecting the at least one transmission parameter based at least upon the estimated level of synchronization (block S36) includes selecting a number of retransmissions. In some embodiments, selecting the at least one transmission parameter based at least upon the estimated level of synchronization (block S36) includes selecting a bandwidth.

In some embodiments, estimating the level of synchronization for the wireless device 12 is based at least upon a characteristic of the synchronization source 13. In some embodiments, estimating the level of synchronization for the wireless device 12 is based at least upon a type the synchronization source 13. In some embodiments, selecting the at least one transmission parameter based on the estimated level of synchronization comprises selecting the at least one transmission parameter based upon the type of the synchronization source 13.

In some embodiments, the synchronization source 13 is one or more of a Global Navigation Satellite System (GNSS), a network entity such as a base station, and/or one or more wireless devices simultaneously transmitting synchronization signals (such as sidelink synchronization signals (SLSS). In some embodiments, the at least one transmission parameter is selected based upon a number of synchronization sources. In some embodiments, the synchronization source 13 is a Global Navigation Satellite System (GNSS) and the degree of synchronization accuracy is based on a number of tracked satellites in the GNSS. In some embodiments, the synchronization source 13 is a Global Navigation Satellite System (GNSS) and the degree of synchronization accuracy is based on an amount of power received from at least one satellite in the GNSS. In some embodiments, the synchronization source 13 is a Global Navigation Satellite System (GNSS) and the degree of synchronization accuracy is based on a status of a detection indicator. In some embodiments, the synchronization source 13 is a network entity and the degree of synchronization accuracy is based on variations in at least one of a time and a frequency reference.

In some embodiments, the processing circuitry 22 is further configured to establish a connection to at least one synchronization source. In some embodiments, the processing circuitry 22 is further configured to establish a wireless connection to more than one synchronization source, wherein each of the more than one synchronization source is assigned a priority level. In some embodiments, the selection of the at least one transmission parameter includes choosing a transmission format. In some embodiments, the selected transmission format is one of a transport block size, a size of packets to be transmitted, a modulation and coding scheme, an amount of physical resources, a number of resource blocks, a number of transmission subframes and an antenna mapping.

In some embodiments, selecting the at least one transmission parameter based at least upon the estimated level of synchronization includes selecting a bandwidth. In some embodiments, selecting the at least one transmission parameter based at least upon the estimated level of synchronization includes selecting a number of retransmissions. In some embodiments, selecting the at least one transmission parameter based at least upon the estimated level of synchronization includes selecting a number of resource blocks associated with the transmission of a packet to at least a second wireless device using the selected at least one parameter. In some embodiments, selecting the at least one transmission parameter based at least upon the estimated level of synchronization includes selecting a modulation and coding scheme (MCS). In some embodiments, selecting the at least one transmission parameter based at least upon the estimated level of synchronization includes selecting a format of the packet.

According to another aspect, a first wireless device 12 is configured to adaptively select a transmission parameter in a device-to-device (D2D) communication network. The first wireless device 12 includes a synchronization estimating module 40 configured to estimate a level of synchronization for the first wireless device. In some embodiments, the first wireless device 12 includes a transmission parameter selection module 42 configured to select at least one transmission parameter based at least upon the estimated level of synchronization. In some embodiments, the first wireless device includes a communication module 44 configured to transmit a data packet to a second wireless device using the selected at least one transmission parameter.

In some embodiments, a method for use in a wireless device for selecting a transmission parameter of a first wireless device in a device-to-device (D2D) communication network is provided. The method includes estimating a synchronization source for the first wireless device. The method also includes selecting at least one transmission parameter based at least upon the synchronization source. The method further includes transmitting a packet to a second wireless device using the selected at least one transmission parameter, wherein the at least one transmission parameter is one or more out of a modulation and coding scheme, a number of resource blocks, a number of transmission subframes, and a number of retransmissions.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for use in a first wireless device for selecting a transmission parameter of the first wireless device in a wireless communication network, the method comprising:
   selecting at least one transmission parameter based at least upon an estimated level of synchronization of the first wireless device to at least one synchronization source, the estimated level of synchronization of the first wireless device being based at least upon a type of synchronization source; and
   transmitting a packet to at least a second wireless device using the selected at least one transmission parameter.

2. The method of claim 1, further comprising:
   estimating a level of synchronization of the first wireless device to the at least one synchronization source.

3. The method of claim 1, further comprising:
   establishing a connection to the at least one synchronization source.

4. The method of claim 3, wherein estimating the level of synchronization of the first wireless device is based at least upon a degree of synchronization accuracy that can be obtained when the synchronization source connection is established.

5. The method of claim 2, wherein estimating the level of synchronization of the first wireless device is based at least upon a characteristic of the synchronization source.

6. The method of claim 2, wherein selecting the at least one transmission parameter based on the estimated level of synchronization comprises selecting the at least one transmission parameter based upon the type of synchronization source.

7. The method of claim 3, wherein the at least one synchronization source is at least one of a Global Navigation Satellite System (GNSS), a base station and at least one wireless device configured to transmit synchronization signals.

8. The method of claim 1, wherein the at least one transmission parameter is selected based upon a number of synchronization sources.

9. The method of claim 4, wherein the at least one synchronization source is a Global Navigation Satellite System (GNSS) and the degree of synchronization accuracy is based on a number of tracked satellites in the GNSS.

10. The method of claim 4, wherein the at least one synchronization source is a Global Navigation Satellite System (GNSS) and the degree of synchronization accuracy is based on an amount of power received from at least one satellite in the GNSS.

11. The method of claim 4, wherein the at least one a synchronization source is a Global Navigation Satellite System (GNSS) and the degree of synchronization accuracy is based on a status of a detection indicator.

12. The method of claim 4, wherein the at least one synchronization source is a base station and the degree of synchronization accuracy is based on variations in at least one of a time and a frequency reference.

13. The method of claim 3, further comprising establishing a wireless connection to more than one synchronization source, wherein each of the more than one synchronization source is assigned a priority level.

14. The method of claim 1, wherein the selecting the at least one transmission parameter includes at least one of choosing a transmission format, selecting a reference signal format and selecting a cyclic prefix.

15. The method of claim 14, wherein the selected transmission format is one of a transport block size, a size of packets to be transmitted, a modulation and coding scheme, an amount of physical resources, a number of resource blocks, a number of transmission subframes, a number of retransmissions and an antenna mapping.

16. The method of claim 1, wherein selecting the at least one transmission parameter based at least upon the estimated level of synchronization includes selecting a bandwidth.

17. The method of claim 1, wherein selecting the at least one transmission parameter based at least upon the estimated level of synchronization includes selecting a number of retransmissions.

18. The method of claim 1, wherein selecting the at least one transmission parameter based at least upon the estimated level of synchronization includes selecting a number of resource blocks to be used for the transmission of a packet to at least a second wireless device using the selected at least one parameter.

19. The method of claim 1, wherein selecting the at least one transmission parameter based at least upon the estimated level of synchronization includes selecting a modulation and coding scheme (MCS).

20. The method of claim 1, wherein selecting the at least one transmission parameter based at least upon the estimated level of synchronization includes selecting a format of the packet.

21. The method of claim 1, wherein the wireless communication network is a device to device, (D2D) communication network.

22. A first wireless device configured to select a transmission parameter in a wireless communication network, the first wireless device comprising:
processing circuitry configured to:
select at least one transmission parameter based at least upon an estimated level of synchronization of the first wireless device to at least one synchronization source, the estimated level of synchronization of the first wireless device being based at least upon a type of synchronization source; and
a communication interface configured to:
transmit a packet to at least a second wireless device using the selected at least one transmission parameter.

23. The first wireless device of claim 22, wherein the processing circuitry is further configured to:
estimate a level of synchronization of the first wireless device to the at least one synchronization source.

24. The first wireless device of claim 22, wherein the processing circuitry is further configured to establish a connection to the at least one synchronization source, and wherein estimating the level of synchronization of the first wireless device is based at least upon a degree of synchronization accuracy that can be obtained when the synchronization source connection is established.

25. The first wireless device of claim 22, wherein estimating the level of synchronization of the first wireless device is based at least upon a characteristic of the synchronization source.

26. The first wireless device of claim 22, wherein selecting the at least one transmission parameter based on the estimated level of synchronization comprises selecting the at least one transmission parameter based upon the type of synchronization source.

27. The first wireless device of claim 22, wherein the at least one synchronization source is at least one of a Global Navigation Satellite System (GNSS), a base station and at least one wireless device configured to transmit synchronization signals.

28. The first wireless device of claim 22, wherein the at least one transmission parameter is selected based upon a number of synchronization sources.

29. The first wireless device of claim 24, wherein the synchronization source is a Global Navigation Satellite System (GNSS) and the degree of synchronization accuracy is based on an amount of power received from at least one satellite in the GNSS.

30. The first wireless device of claim 24, wherein the at least one synchronization source is a Global Navigation Satellite System (GNSS) and the degree of synchronization accuracy is based on a status of a detection indicator.

31. The first wireless device of claim 22, wherein the processing circuitry is further configured to establish a wireless connection to more than one synchronization source, wherein each of the more than one synchronization source is assigned a priority level.

32. The first wireless device of claim 22, wherein the selection of the at least one transmission parameter includes selecting a transmission format, and wherein the selected transmission format is one of a transport block size, a size of packets to be transmitted, a modulation and coding scheme, an amount of physical resources, a number of resource blocks, a number of transmission subframes, a number of retransmissions, and an antenna mapping.

33. The first wireless device of claim 22, wherein selecting the at least one transmission parameter based at least upon the estimated level of synchronization includes selecting a number of resource blocks associated with the transmission of a packet to at least a second wireless device using the selected at least one parameter.

* * * * *